United States Patent [19]

Gardner et al.

[11] Patent Number: 5,387,907
[45] Date of Patent: Feb. 7, 1995

[54] HIGH DATA RATE WIRELINE TELEMETRY SYSTEM

[75] Inventors: Wallace R. Gardner, Houston; Kenneth R. Goodman; Robert D. Puckett, both of LaPorte, all of Tex.

[73] Assignee: Halliburton Logging Services, Inc., Houston, Tex.

[21] Appl. No.: 81,710

[22] Filed: Jun. 25, 1993

Related U.S. Application Data

[63] Continuation-in-part of Ser. No. 976,848, Nov. 16, 1992, abandoned.

[51] Int. Cl.$^6$ ............................................. G01V 1/00
[52] U.S. Cl. ................. 340/854.9; 340/855.3; 340/855.4; 367/78; 175/40
[58] Field of Search ............. 340/854.9, 855.2, 855.3, 340/855.4; 367/78; 175/40

[56] References Cited

U.S. PATENT DOCUMENTS

| | | | |
|---|---|---|---|
| 3,732,495 | 5/1973 | McRae et al. | 325/60 |
| 3,814,858 | 6/1974 | Parker | 179/15 BT |
| 4,355,310 | 10/1982 | Belaigues et al. | 340/855.4 |
| 4,384,364 | 5/1983 | Henning | 455/60 |
| 4,581,613 | 4/1986 | Ward et al. | 340/856 |
| 4,891,641 | 1/1990 | Gard et al. | 340/857 |
| 4,901,289 | 2/1990 | Cretin et al. | 367/34 |
| 5,010,333 | 4/1991 | Gardner et al. | 340/856 |
| 5,091,725 | 2/1992 | Gard | 340/854.1 |

OTHER PUBLICATIONS

Honig & Messerschmitt, Adaptive Filters: Structures, Algorithms, and Applications, 1984, pp. 35-84.

*Primary Examiner*—J. Woodrow Eldred
*Attorney, Agent, or Firm*—Arnold, White & Durkee

[57] ABSTRACT

In a well logging tool forming a data stream for telemetry to the surface, an encoding system is located downhole cooperative with surface located decoding equipment. The encoder converts serial data into NRZ symbols, then duobinary code of seven levels and then into quadrature modulating signals on a complex carrier. The decoder at the well surface receives the quadrature modulated complex carrier, forms inphase and quadrature components and decodes the two components. The decoder includes circuit means removing the intersignal distortion and also intersymbol smearing. This enables very significant telemetry ratio.

9 Claims, 7 Drawing Sheets

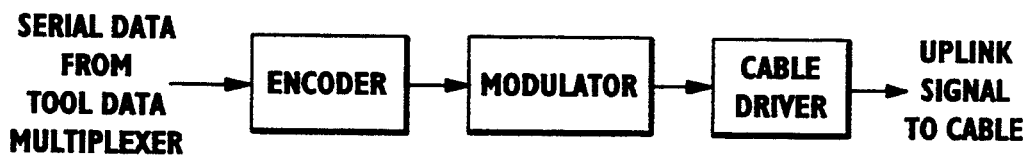
Fig. 2
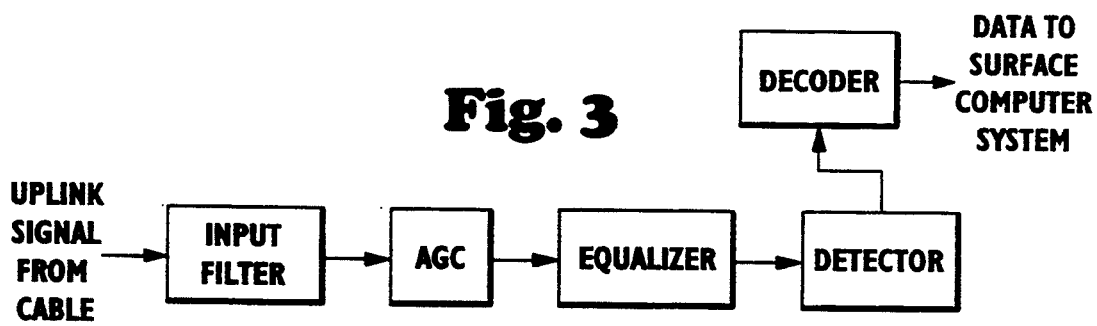
Fig. 3
Fig. 6
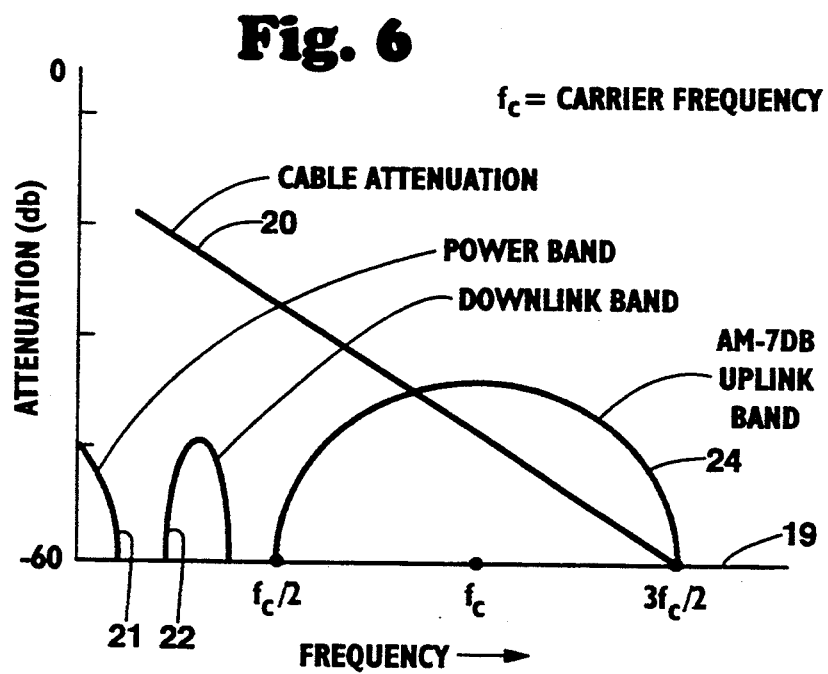

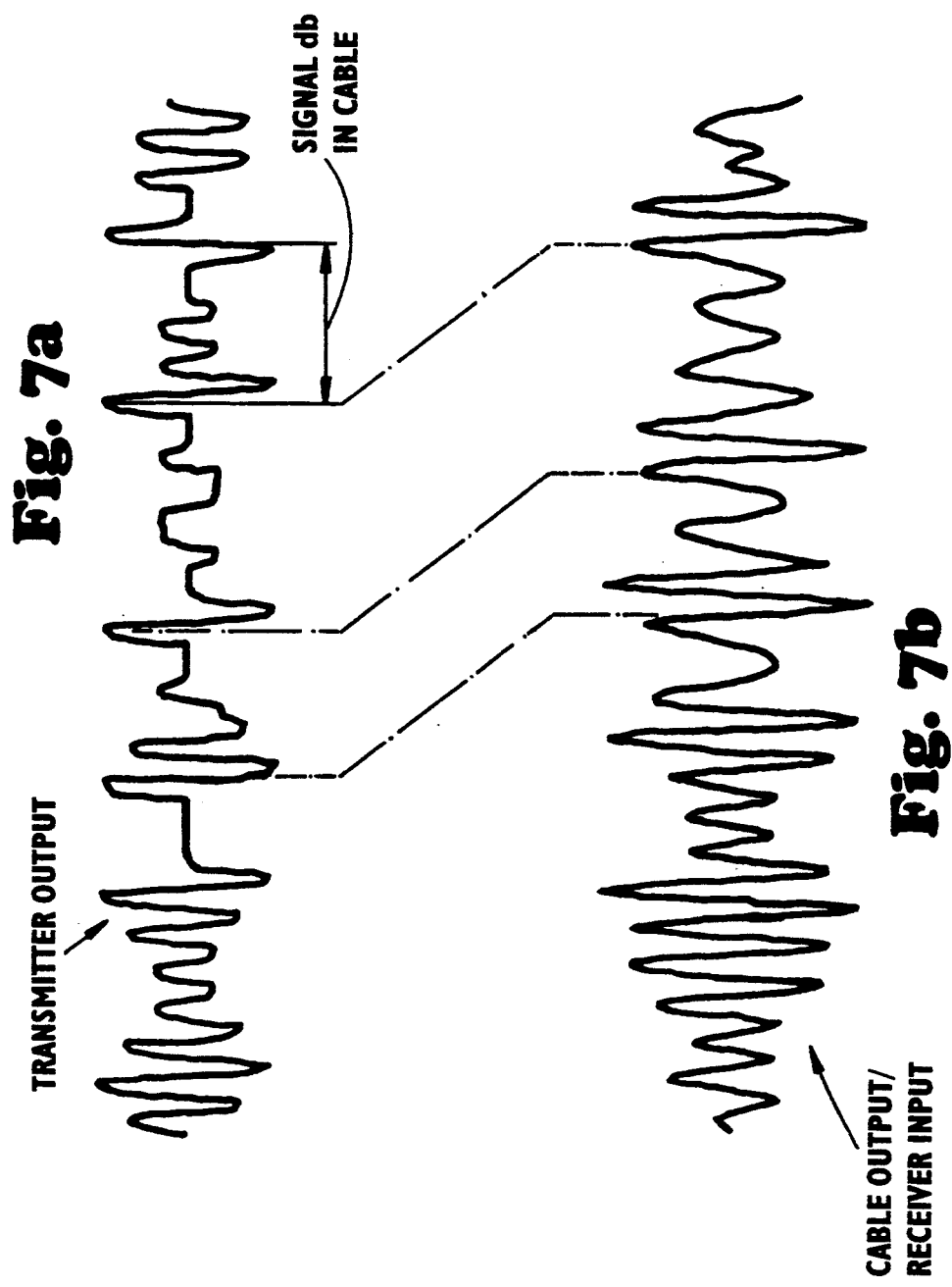

HIGH DATA RATE WIRELINE TELEMETRY SYSTEM

BACKGROUND OF THE DISCLOSURE

This application is a continuation in part of Ser. No. 07/976,848 filed on Nov. 16, 1992, now abandoned, which is incorporated herein specifically by reference for all purposes. The present disclosure set forth a telemetry system which is especially useful in well logging tools. This disclosure represents an improvement over that structure which is shown in Pat. No. 5,010,333 which issued on Apr. 23, 1992 and which is directed to a digital telemetry system. In that particular disclosure, a system was set forth which provided a substantial data transfer rate of about 54 Kbp (kilobits per second) utilizing a toonotable transmission system. That system represents an effective system for the data flow rate. However, as tools have become more complex, and provide greater quantities of data, the performance of downhole logging tools has become so demanding that a greater data flow rate is required. This disclosure set out a data flow rate which can be as high as 720 kilobits per second. The present system therefore satisfies the requisite goal of transmitting this data flow rate in the most of severe circumstances. That severe circumstance is defined as providing this data transfer rate on a logging cable of at least 30,000 feet in length wherein the cable is a 7 conductor cable provided within an armored logging cable having a nominal size of 15/32 inches. This is accomplished by utilizing the 90 to 270 Khz frequency band of the cable. As will be explained in some devil below, a system of preparing the sisals for telemetry accomplishes this level of data transmission taking advantage of an encoding and decoding system in which the transmission rate bandwidth efficiency is 4 bits per second per hertz. The transmission system will be described in substantial devil below.

Downhole logging tools have grown in complexity. Going back 40 perhaps 50 years, downhole logging tools normally performed downhole measurement which measurement were coupled to the surface in the form of analog signals. At that time, wells were relatively shallow and the cable was therefore relatively short. Most of the shallow oil fields have been found, and today's more complex technology is required because the search for significant oil fields has extended deeper into the earth. While the wells become deeper, the measuring devices have also become more complex. That is, they provide data at a much greater rate. Moreover, the advent of digital computers installed at the well head measuring equipment have enabled the handling of greater volumes of data in a more effective fashion. All of this has occurred simultaneously increasing the requirements on the logging cable. The cables have become more complex i.e., they have added conductors, and the band pass requirements for the conductors have been increased. Thus, it is not merely enough to provide a twisted pair of wires in a cable. Cables are now constructed which have carefully tailored transmission characteristics. In other words, logging cables now have performance characteristics which are similar to those of coaxial cables. This has enhanced the band pass characteristics of the cables. That however is not a fixed and automatically predictable factor. For instance, a logging cable of 30,000 feet is normally transported to a well logging site by truck. The cable is spooled on a drum or reel and is carried on the truck to the logging site. While it may have a nominal characteristic impedance when considered in a laboratory, the cable impedance is all together subject to variation depending on temperature. It is not uncommon to conduct well logging operations in northern environments where the cable on the drum is maintained at the ambient air temperature which can be as low as 0°, or even colder. The cable is then spooled from the drum and feed into a well as a tool is lowered into the well. It is not uncommon for portions, but not all of the cable, to be heated in the well. Ultimately, the remote end of the cable will take on the ambient temperature prevailing at the bottom of the well. Those temperatures can go as high as 400° F., and sometimes even higher. The logging cable impedance is varied in a way which is not readily predicted with care and accuracy beyond the generalizations made in this statement. Consider also the possibility that the remote end of the cable is first heated and then cooled as part of the cable is retrieved, and then the logging run is repeated two or three different times. For instance, it may be necessary to log three or four times across a zone spanning the depths of 18,000 feet to 21,000 feet. In this instance, several thousand feet of the logging cable will be pulled from the well, cooled again to the ambient temperature, and then spooled back into the well. Moreover, there is no pattern in which the bottom hole ambient temperature necessarily raises the temperature in the well at intermediate points. This in part depends on the rate of production of formation fluids, the ambient temperature of the various layers of the earth which are intercepted by the well, and many other factors. In summary, the cable temperature varies impedance.

The telemetry system of this disclosure sets out a cooperative surface receiver and downhole transmitter which operates in conjunction with downlink command signals. The equipment in the logging tool is sufficiently complicated that it is not merely switched on or off. Rather, it is necessary to provide relatively complex transmissions from the surface to the logging tools so that the logging tool is appropriately instructed. The present disclosure sets out a telemetry system which can accomplish this using a high quality logging cable which has a very substantial bandwidth and which enables the maximum transfer of data along the cable. Moreover and just as importantly, the variable data which is measured by the logging tool is transmitted up the cable in a specified frequency band which is separate from the frequency band used for the command signals which are transmitted down the cable. A third requirement of the cable is to provide electrical power from the power supplies at the surface along the logging cable to the equipment supported in the logging tool. This represents a third transmission along the cable and this particular transmission involves the transmission of electrical power. While this may include DC power, it also includes low frequency AC power which may also required for operations. That defines a third frequency band which is placed on the same logging cable and represents a different kind of transmission where the difference emphasized in this aspect is the frequency separation.

Speaking very generally, the cable provides transfer functions for the data. If the data has the form of a pulse train, and that data pulse is imposed on the cable and transmitted to the surface, appropriate Fourier analysis of the data that is transmitted up the cable will show that it is rich in harmonics. As the number of data pulses transmitted increases, and as the pulses are transmitted closer together, the harmonics necessary to reconstruct the pulse wave form at the surface are attenuated by the logging cable impedance at higher frequencies. Thus, the Fourier analysis of the pulse train will show that it is rich in high frequency harmonics which simply are not received with adequate amplitude. Inevitably, a sharply defined square pulse wave form transmitted from the logging tool at the bottom ultimately is distorted and becomes rounded. That is, the received signal looses the square corners and it becomes more difficult to recognize the particular pulse. Worse than that, the pulse amplitude is changed so that a digital signal having a specified amplitude or height is not sharply defined at the surface because the received signal amplitude will vary. As discussed in the foregoing patent, a system is there provided which enables conversion of a variable received signal to a particular amplitude. The loss of definition of the pulse must be overcome so that the pulse can be reconstructed and the digital data then provided.

The present disclosure is cooperative with a cable having 7 conductors. It is not possible to further enhance the cable performance by adding conductors. Cables are constructed in accordance with an industry standard which limits the number of conductors in the cable to 7. It has been found that the addition of conductors in the cable coupled with the cable diameter requirements which are inevitably tied to the number of conductors creates a real problem in cable design. It is not possible (free of cost) to enhance the cable data transfer rate by simply increasing the number of conductors in the cable or by adding shielding. Cable strength requirements as well as the electrical insulation requirements provides real limits to the number of conductors and the band pass of the conductors in the cable. Moreover, the cable diameter imposes a physical limitation. For instance, an increase of 1/32 of an inch in cable diameter may seem relatively minor; when considered in the context of a 30,000 foot cable which is spooled on a drum, even a small increase in diameter markedly changes the amount of cable that must be wound on the drum. As the cable becomes larger in diameter, cable handling is made much more difficult.

With the advent of logging tools which provide a much larger data flow rate, and taking advantage of the enhanced bandwidth, a remarkably large data flow rate through the telemetry system has been obtained. The present system utilizes a logging tool which provides data in some suitable format such as NRZ data (a series of digital bits which does not return to zero). Data is typically collected from several different tool sources, provided on a tool bus, combined in an organized fashion, serialized to NRZ, encoded and modulated for cable transmission to the surface connected equipment.

This system converts a data stream of NRZ information into two four level data streams. This is done by grouping two successive bits of NRZ data to form a single data symbol which has four levels or states. The four level signal is next converted into a seven level duobinary signal that requires half the bandwidth of the four level signal and only ¼ of the bandwidth of the original NRZ signal. Two such streams of data are provided meaning two streams of the seven level duobinary signals. Thus, there is an enhanced aspect over the system of the '333 disclosure in that a quadrature signal is created from the two data streams. The quadrature signal differs in phase by 90°. This system encodes the data stream so that it then has the form of a complex signal (meaning it has a first component defining the phase of the signal and also the quadrature component) and this complex transmission is ultimately provided to a complex modulator which is also provided with a complex carrier signal. The two signals (one being the reference phase and one being the quadrature phase) are more efficient so that enhanced transmission can occur.

To review one aspect of the present invention, transmission of an NRZ signal can provide a transfer of about 1 bit per second per hertz of bandwidth. The quadrature signal of the present disclosure can provide 4 bits per second per hertz. The quadrature signal is thus comprised of the two data streams which are modulated for transmission and which are readily sorted at the surface during demodulation.

One will observe that brute force increases in the data transfer rate simply will not suffice. The data transfer characteristics of the cable provide finite limitations. In other words, a simple increase in the data transfer rate encounters data quality loss as a result of the limited frequency bandwidth tolerated by the cable so that the signal output has reduced harmonic content, creating distortion. A loss of harmonics is one source of the distortion, and there is the great likelihood of undesirable phase shift between harmonics even should higher frequency harmonics be transmitted. Furthermore, adjacent digital signals will create inter-symbol interference during transmission. Each pulse is broadened or smeared, so to speak. This system provides a quality signal transmission system with a desirable signal to noise ratio for high quality digital transmission. In part, this is accomplished by using seven levels for the digital data wherein the seven levels are centered about a zero level so that there are three levels above zero and three levels below zero. This symmetrical arrangement about zero encodes the data in a multilevel correlative coding scheme while limiting the transmission bandwidth of the signal. By utilizing a quadrature encoding mechanism having a complex carrier and complex modulator, the data is thus converted into the quadrature signal as mentioned.

This disclosure therefore provides an optimum bandwidth efficiency so that the data transfer rate is maximum. It utilizes a 49 point constellation system where 16 (4 bits) state symbols are encoded to the 49 points. This provides thirty three surplus states which surplus states encode some added aspect of the adjacent symbols. By doing this, each symbol (one 49 point entity) provides the 16 state symbol and a manner by which it can be decoded, and some aspect of an adjacent symbol(s). This reduces bandwidth and provides a more accurate data recovery. Adjacent signal correlation is thus carried out at the receiver which is located at the surface. Because seven level signals are formed in phase and also in quadrature, the signal is really a 49QPRS signal, referring to 49 states in the complex system.

The present system involves a telemetry system which accommodates variable distortion initiated by the cable as a result of cable usage. Because the cable is not precisely fixed and because the transfer function of the cable is variable, both with time and with temperature and is variable in a fashion not readily known, the distortion is both variable and unknown so that it must be dealt with dynamically where system parameters are not known in advance. At the surface where the signal is received with distortion, the signal is input through an adaptive transversal filter equalizer which is a system which automatically adjusts the transfer function to correct for the variations that occur from symbol to symbol and cable originated distortion. The 49 QPRS encoding system thus permits a single 49 point symbol to encode four bits obtained from the NRZ binary data. 49 point constellations are more difficult to decode. However, that approach enables the transmission of more data without requiring additional bandwidth or, given a fixed bandwidth, the 49 point system enables the transmission of enhanced data rates. The data recovery at the surface is therefore limited by the distortion and signal to noise ratio. The signal to noise ratio is dependent on the quality of cable; therefore, the present system best cooperates with the high quality cable mentioned above. The distortion is dealt with by the present invention. Distortion resulting from transmission is reduced by the present system so that the data transmission rate is raised to permit transmission of the 40QPRS signal format. Distortion is therefore reduced to enable this type transmission and the related bandwidth efficiency.

At the surface, the receiving apparatus utilizes an AGC along with a clock recovery circuit. This reconstructs the clock signal from the received signal so that the received signal can be synchronized with the clock at the surface which is slaved to the clock in the downhole logging equipment. The equalizer utilizing the above mentioned filter works in conjunction with a slicer circuit to determine which of the forty nine signal constellation points is being transmitted in each symbol. A descrambler circuit is included which reverses the effect of the sonde located scrambler. As required, and assuming that the downhole tool provides data from two or more different tools which data streams are multiplexed, the surface equipment likewise includes a demultiplexer running at the same rate. That can readily be implemented by transmitting the appropriate signals along the data string in a fixed multiplex format, and the signals are then recovered by demultiplexing which typically recognizes the individual time frames of the transmitted data and forms output data which is delivered for processing.

As mentioned in the above noted patent, the equalizer and slicer overcome the impact of the highly variant distortions which result from the cable interposed between the sonde supported logging tools and the surface. The equalizer and slicer jointly enable recovery of a misshapen pulse at the surface. Indeed, the pulse stream no longer has the shape or profile of specific pulse levels, but, to the unaided eye, the data has the appearance of an analog signal. From that, the transversal filter equalizer recovers specific signal levels and the slicing circuit restores the signal levels to the step functions which are defined in the duo binary seven level symbol. This helps overcome errors imposed on the signal transmission system as a result of the cable. The two data streams are recovered by breaking the complex data flow into the quadrature and inphase components which are both processed in this fashion.

In comparison with the system mentioned in patent '333, the present disclosure enables the transmission of an extremely large data rate, i.e., 720 kilobits per second. This data transfer rate is a markedly better result from that obtained in the referenced patent which utilizes a frequency band of about 40 Khz having a top data rate of about 54 Khz. In summary, the present system provides a 720 kilobit transfer rate obtained from a quadrature encoding system utilizing a 49 QPRS symbol transmission along the logging cable.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 is a simplified view of the uplink transmitter located in the sonde of FIG. 1

FIG. 3 is a simplified view of the uplink receiver at the surface;

FIG. 6 is an allocation of frequency bands plotted on a graph showing attenuation and frequency;

FIG. 7 is a comparison with the transmitted signal with the receiver input showing the effects of signal distortion including time delay as a result of transmission through the telemetry system.

DETAILED DESCRIPTION OF THE PREFERRED EMBODIMENT

Figure 1:
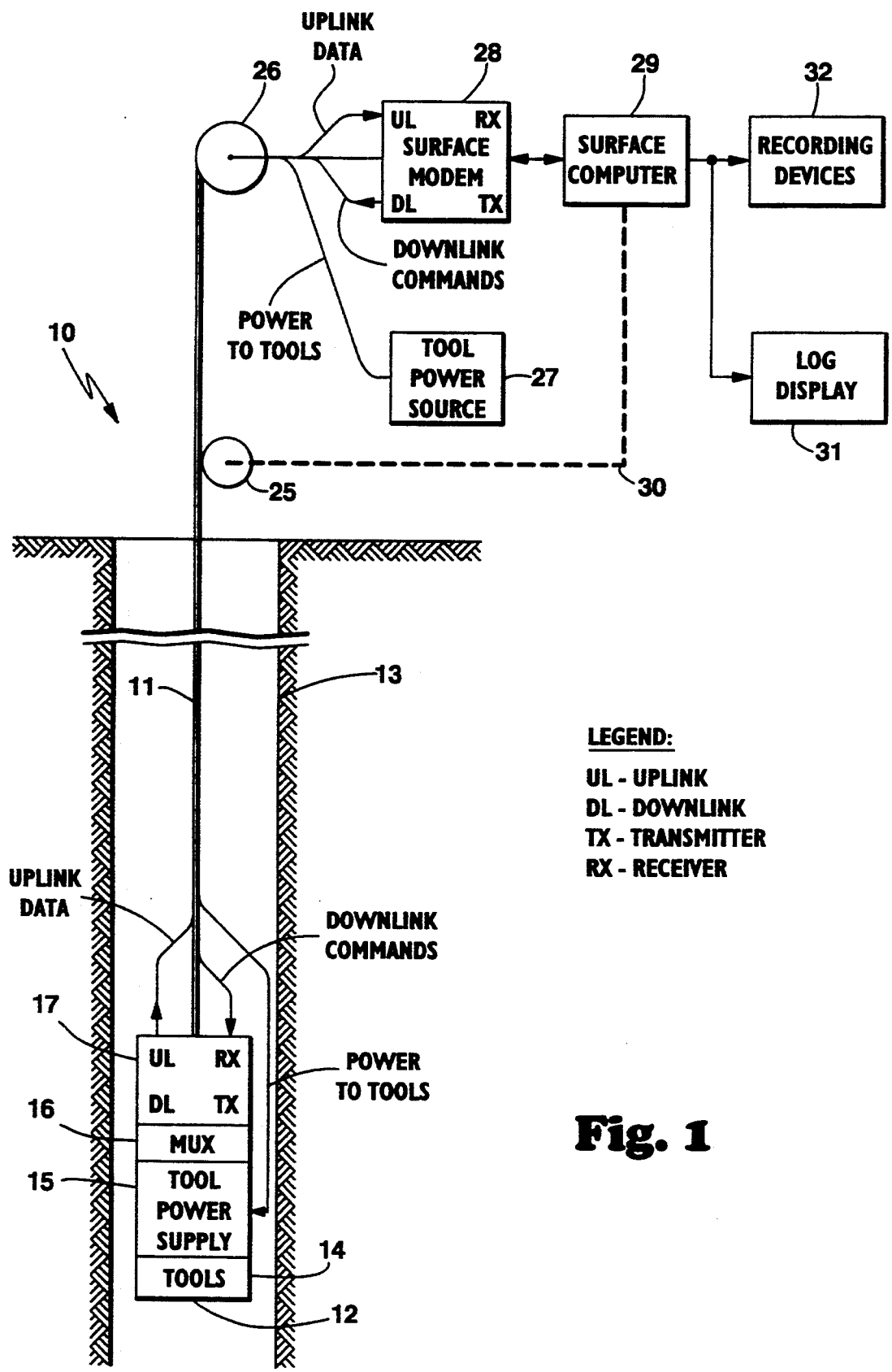
FIG. 1 is a logging system in accordance with teachings of the present disclosure showing a sonde supported on a well logging cable further incorporating multiple tools creating a large data flow rate which requires telemetry of the data up the logging cable in response to downlink instructions and electrical power transmitted to the sonde from the surface and wherein the data is recorded as a function of depth.

Attention is momentarily directed to FIG. 1 of the drawings which shows in a system view the well logging apparatus of the present disclosure. As a generalization, the apparatus shown in FIG. 1 is generally identified by the numeral 10 which refers to the entire well logging system. The apparatus 10 will be described preceding from the equipment in the well to the surface. A logging cable 11 suspends a sonde 12 in a well borehole 13. The well can be any depth, and as will be discussed, the length of the logging cable 11 is arbitrarily set at 30,000 feet because wells of that depth are drilled. The sonde 12 has the form of a protective shell or housing which is a fluid tight pressure resistant housing which enables the equipment on the interior to be supported and protected for operation. The sonde encloses one or more logging tools 14 which are included for making measurements. They are tools which form data useful in analysis of the well and also useful in determining the nature of the formations which are adjacent to the well 13. For instance, various types of radiation responsive tools are known such as those which respond to the gamma radiation in the vicinity. Other types of tools may test the nature of the lining in the well, for example, the quality of the bond between the cement on the exterior of the well casing. The well can be open hole or cased; it is drilled by a drill bit on a drill stem and thus forms an open hole construction initially and that is subsequently lined with a steel pipe known as casing, and the casing is cemented in place by positioning cement on the exterior of the casing to prevent artesian water communication along the exterior of the casing. This assures that leakage does not occur from one formation to another. The sonde 12 also encloses a power supply system for the equipment in the sonde. If two or more tools are included which make measurements and provide output data streams, the data is provided to a multiplexer located in the sonde. Last of all, the electronic assembly in the sonde encloses an uplink communication device, a downlink communication device, a data transmitter and also a data receiver. The term *uplink* and its opposite *downlink* refer to those aspects of the tool operation which involve transmission of control signals and synchronization signals along the cable 11. Such signals are necessary to coordinate operation of the equipment in the sonde and also to coordinate operation of the equipment at the surface. There is also a frequency defined communication channel in the logging cable for the data. Generally, the data is measured downhole and, accordingly, the data transmission up the cable (uplink direction) is of substantial significance in the operation of this system. The timing of the measurements is made subject to control of the surface equipment which control is communicated down the cable in the downlink direction while the transmitter is utilized primarily for transfer of the measured data (after multiplexing) so that the surface equipment is provided with the necessary and useful data by means of transfer.

Figure 4:
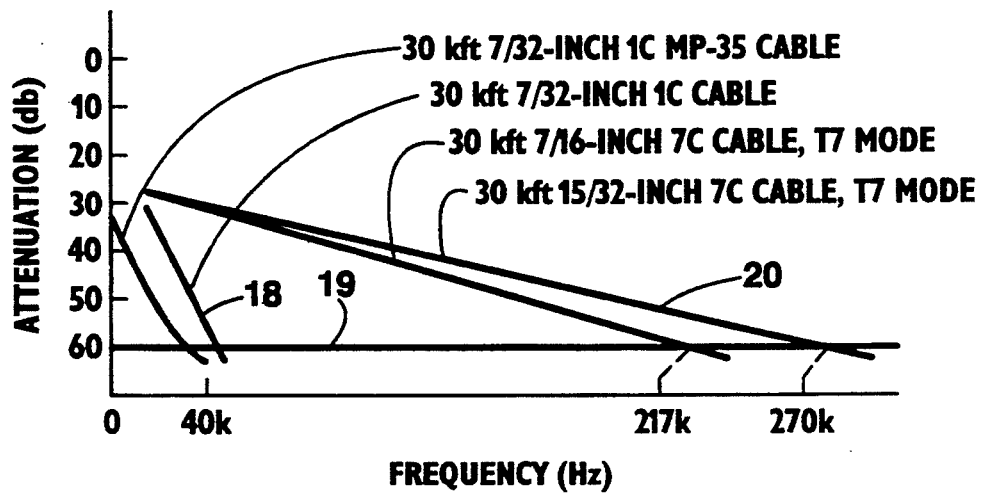
FIG. 4 is a graph of the frequency response of several different cables.
Figure 5:
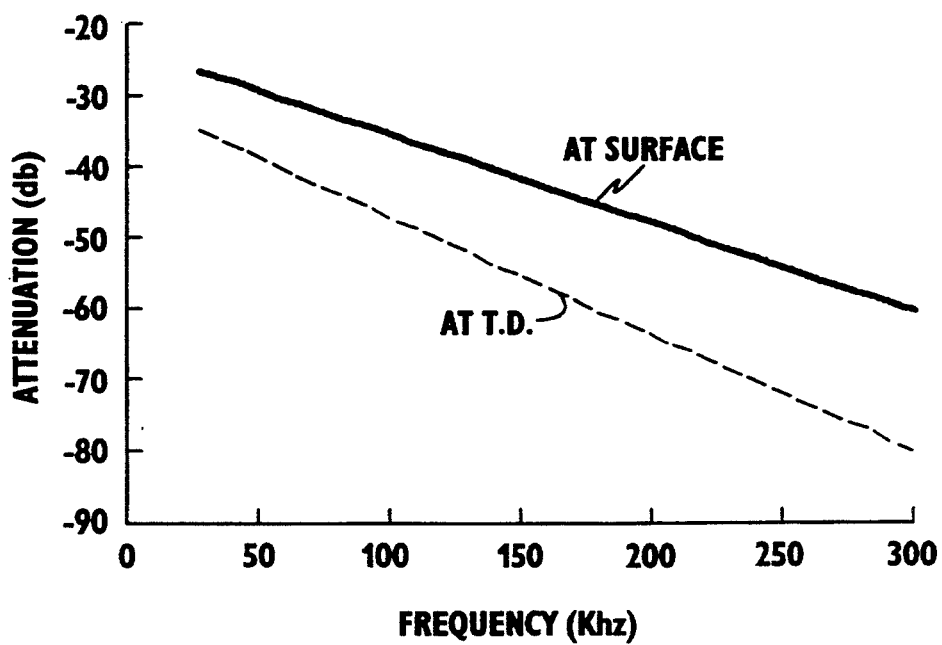
FIG. 5 is a graph showing cable attenuation as a function of frequency and temperature at the surface in one curve and at a depth of 22,000 feet.

So that some understanding can be obtained of the interplay between the data transfer rate and the cable, attention is next directed to FIGS. 4, 5 and 6 of the drawings. All of the graphs show a response curve where the ordinate is representative of cable attenuation. The graphs of FIGS. 4 and 6 show the cable frequency response 20 and extends as high as 270 or perhaps 275 kilohertz. This is a graph of cable response for a 30,000 foot cable. As further shown in FIG. 4, the curve 18 identifies the response of a 7/32 inch cable which is provided with a single conductor. That cable in conjunction with the data transfer system shown in the '333 patent enables the transmission of about 54 kilobits of data per second. As illustrated, it has a maximum frequency above 40 kilohertz. The minimum transmission requirement 19 is entailed in a 60 dB signal loss in transmission. As a generalization, if the loss is greater, then there is some difficulty in obtaining sufficient amplification to recover the high frequency content of the transmitted signal. The various curves show the frequency and attenuation response of different cables. FIG. 5 shows how the cable performance is degraded at a depth of 22,000 feet where the cable is exposed to extreme ambient temperatures. The cable suffers nearly a 20 db charge in attenuation.

The present disclosure is intended to cooperate with a cable having the attenuation characteristics represented by the curve 20. This cable is a cable which is provided with seven conductors and has sufficient frequency characteristics that the 60 dB attenuation threshold 19 level permits transmission of frequencies as high as about 270 kilohertz. This particular frequency pass band permitted by the cable will be related to the other equipment in the system as details of the operative equipment are given.

In FIG. 6 of the drawings, the maximum frequency range for data transmission permitted by the cable 20 is utilized. This defines an available spectrum which is then divided in the following fashion. There is a first spectral region at 21 which is substantially near a frequency of zero. This frequency spectrum also includes 60 Hz. In this region, electrical power for operation of the tools in the sonde 12 is sent. By setting aside this spectral region, the tool power supply (see FIG. 1) is provided with adequate power for operation of the equipment. More importantly, it is a spectral region which is isolated from the other spectral regions as shown in FIG. 6. This isolation permits the relatively substantial separation of the three spectral bands shown in FIG. 6. As will be understood, there is always the possibility of cross talk from data transferred in one spectral band into another spectral band. Utilizing the separation suggested in FIG. 6, the spacing enables easy separation with a minimum of circuit components providing spectral band filters. The spectral band segment at 22 is included for the transmission of downlink instructions. The downlink instructions normally include control instructions to the equipment. Thus, the downlink spectral region 22 is a communication channel for transmitted instructions, computer hand shake return signals and the like.

FIG. 6 additionally shows a carrier frequency centered at 180 kilohertz and an uplink spectral band 24. As a practical matter, the spectral band 24 is centered so that the maximum frequency in the spectral band 24 is the maximum frequency which can be transmitted in view of the cable attenuation actually encountered. Therefore the intercept of the cable attenuation curve 20 with the 60 Db attenuation line specifies the maximum frequency point for the spectral band 24. In this particular instance, it is about 270 kilohertz. By defining a spectral band 24 which is about 180 kilohertz in width, the center frequency is 180 kilohertz. The upper frequency limit of this band is 270 kilohertz while the lower frequency limit is 180 kilohertz lower. This means that the spectral band has the range from 90 kilohertz up to 270 kilohertz, or a frequency bandwidth of 180 kilohertz. As noted earlier, the present system provides a method of data telemetry which enables a provision of four bits of data per hertz, or in this particular instance, 720 kilobits total data transmission. This extraordinary data transfer rate enables the present apparatus to communicate an extraordinary amount of data on the logging cable, even under the severe circumstances of a 30,000 foot cable subject to all sorts of variations in its transfer function.

Attention is momentarily directed to FIG. 7 of the drawings which provides a very graphic representation of the problem which is encountered in the present system. FIG. 7 of the drawings shows two curves. The top curve is the shape of the transmitter output provided on the cable 11 from the sonde. The signal actually transmitted has two components, one being in phase and the second being a quadrature component. FIG. 7 shows only a seven level duobinary signal with representative distortion. In the 49 QPRS signal actually used, distortion is much worse but it cannot easily be illustrated because the two dimensional drawing cannot show the quadrature aspect with the typical distortion. This output obtained from a seven level duobinary transmission scheme in accordance with this disclosure is placed on the cable for transmission. The lower curve shows the input to the receiver at the surface. As will be understood, there is a signal delay in transmission along the cable. More profoundly, there is a substantial amount of signal distortion as the signal is transmitted up the cable so that the distorted signal received at the surface must be analyzed in the fashion described in this disclosure to enable the surface receiver to properly reconstruct and record the signal to have a meaningful signal content. The problem of data reconstruction is inevitably tied to signal distortion in the cable. Therefore the present system describes the equipment appropriate to restore the received signal at the bottom of FIG. 7 to a form necessarily resembling the transmitted signal at the top of FIG. 7. Then, the data in the transmitted signal is recovered, placed in a suitable format, and recorded as a function of depth.

Attention is directed to FIG. 5 of the drawings which shows the response of a seven conductor cable. This shows the frequency response as a function of temperature with the cable completely at the surface and with the cable suspended in a well to a total depth of 22,000 feet. As will be observed, there is at very low frequencies a drop of approximately 10 dB in signal transmission capability. The attenuation is much more severe at the high frequencies, the two curves showing a difference of about 20 dB at a frequency of about 300 kilohertz. With deeper wells, the problem is more severe. With surface temperatures typical of winter time, the problem is made much more severe. As will be understood, FIG. 5 explains in some detail part of the problems that are encountered in the telemetry of data along the logging cable. Problems such as that shown in FIG. 5 are manifest in the loss of wave form shape and also the signal delay as illustrated in FIG. 7 of the drawings.

Returning now to FIG. 1 of the drawings, the system includes a sheave which is utilized in guiding the logging cable 11 into the well. The cable 11 is spooled on a cable reel 26 or drum for storage. As noted, the cable can readily be as long as 30,000 feet. In any event, the cable on the reel connects with the sonde 12 and is spooled out or spooled in to raise and lower the sonde 12 in the well borehole. The conductors in the cable connect with surface located equipment. That equipment includes a DC power source 15 which provides power to the tool power supply. This power transmission occurs in the spectral region 21 mentioned with regard to FIG. 6. The surface located equipment transmits the downlink instructions to the sonde and primarily receives transmitted data from the sonde 12 which is sent up to the surface equipment. The data is placed in a suitable format and is provided to a surface located logging system. The sonde 12 encloses the power supply 15, a multiplexer 16, and uplink and downlink electronics 17. A sheave 25 is connected by a suitable means input to a depth measuring system 30 which provides a signal input to record sonde depth in the well. This enables correlation of the measurements to a particular location in the well. The surface electronics 28 (discussed later) forms signals input to a surface computer 29 forming an output for a logging display 31 and a recording device 32. The surface logging system forms output data as a function of depth. The recorders are incorporated to make a permanent record of the data as a function of depth in the well.

DATA TRANSMISSION ON THE LOGGING CABLE

As mentioned, the logging cable 11 can readily be 30,000 feet in length. The telemetry system can tolerate a signal drop of up to 60 dB attenuation and still provide an acceptable signal. This drop however is frequency dependent, see FIG. 6. The drop in output signal as a function of frequency distorts the transmitted pulse. The cable also typically includes a sheath or wrapping which shields the electrical conductors on the interior, and thus comprises a cable of sufficient strength to support the sonde 12 and the weight of the cable itself. The sonde 12 is lowered to the bottom of the well, and is retrieved on the cable 11. During retrieval, data is collected by surface located equipment. The data is provided through the telemetry link along the cable 11. Appropriate logging tools of different types are incorporated in the sonde. The precise logging tools can vary but includes those which are used for downhole well logging operations. The cable 11 passes over the sheave and is directed to the drum 26 where it is spooled and stored. The entire cable is wound on the drum which is typically truck conveyed to the site of the well. The cable 11 provides an output connected to three different types of circuits as shown in FIG. 1. In part, the cable 11 delivers electrical power for operation and hence is connected to the DC power supply 15. This furnishes DC current flow for operation of the sonde located ! equipment. The voltage is a few hundred volts and the current level can be substantial. Moreover, there is a downlink transmitter DLTX which directs encoded signals along the cable 11 to provide instructions for control and operation of the sonde 12. In addition, there is an uplink receiver ULRX also connected to the cable. Telemetry data from the sonde is transmitted to the uplink receiver. In summary, the cable 11 must provide a current flow path for DC current sufficient to operate the equipment, and also carries different frequency signals for uplink and downlink communication. This disclosure particularly focuses on the uplink telemetry transfer through the cable.

In operation, data is acquired while retrieving the sonde 12 from the bottom of the well and conducting measurements as it moves along the well borehole. The valuable data particularly must be provided as a function of sonde location in the borehole. The depth measuring system is connected with the sheave 25 by the means 30 to obtain indications of cable retrieval. This forms a depth indication so that suitable data from tools to be described can be recorded as a function of depth. The surface located logging system will be described in detail below.

This data transfer system is typically installed in a sonde used in a well which is uncased, or is an open hole in the lower portions of the well. There are additional information measuring tools 14. The measuring tools 14 are housed in the sonde. They can be any type of tool appropriate for logging. For example, the tools 14 can include devices known in the art for measuring resistance of the formation, tools for measuring specific concentrations of potassium, thorium and uranium, etc. The tools may use any type of stimulus including irradiation of adjacent formations with high frequency radiation or bombardment with neutrons. Without regard to the wide variety of tools, it is sufficient for purposes of this disclosure to note that the tools 14 provide output data formed into a data stream. The data stream may be series or parallel words, and the encoding can also vary.

The data stream will at various points be converted into the NRZ format (no return to zero). This is detailed in the '333 patent incorporated by reference. The NRZ format is converted in subsequent portions of the system and is therefore discussed at this juncture. Another internal data format is the 1553 format conveniently used for transfer from individual tools to a sonde bus control unit. The data from the tools 14 can be in the 1553 format and may be readily converted to this or any other data format. The data streams from the tools 14 are all delivered to a bus control ("BCU") unit. The BCU is commanded from the surface via downlink instructions to the receiver DLRX in the bus control unit, that in turn operates the various tools to therefore deliver uplink data in patterned and interleaved bursts. The data flow is continuous but has the form of bursts or frames of specific length and organization. The tool output is preferably a 1553 formatted sequence of data which is organized in appropriate data blocks or frames based on operation of the BCU. All of this data organization is under control of commands from the surface. This assures that the data delivered by the cable 11 is organized in such a fashion that the significance of the data can subsequently be determined. Each of the logging tools 14 forms data connected through suitable interfaces. The tool data, when commanded, is placed on a bus to the BCU. An acceptable data format enables each of the tools to form individual data blocks with suitable identification and measured values.

SUBSURFACE DATA CONVERSION

The output of the BCU is a stream of data in NRZ format as stated in the '333 patent. It is delivered to a scrambler in FIG. 10 to be described. The scrambler avoids an excessive number of zeros or ones in the data string. The scrambler converts the data string so that there is a pseudorandom mix of zeros and ones. The data is then delivered to an encoder and converted into a seven output levels. The seven levels are 3, 2, 1, 0, −1, −2 and −3. The drawings of the '333 patent show the seven logic levels implemented by conversion into specific voltage levels and recovery after transmission. The seven logic levels are distorted as they are transmitted so that some type of recovery must be made to overcome the distortion to restore distorted values to specific output levels. Since the input is in NRZ format, two consecutive NRZ bits input to the system define four level encoding. The encoder therefore changes two adjacent NRZ data bits into a four level symbol which is converted into one of the seven levels output by the scrambler. The seven level encoding in the context of a quadrature system will be given later. In the system described herein, two such 7 level streams are combined in quadrature, forming a 49 QPRS signal.

The 49 QPRS signal is then supplied to the cable 11 for transmission by a power amplifier which provides an adequate drive input to the cable 11 for transmission. The amplified signal is delivered by an uplink transmitter ULTX (FIG. 1) which forms an output delivered to the cable 11. This telemetry interconnection sends the data up the cable 11.

The sonde also encloses the downlink receiver DLRX shown in FIG. 1. It forms an output control signal from the received surface instructions and provides appropriate control signals to the BCU which in turn directs operation of the various logging tools within the sonde 12. The sonde also encloses the tool power supply 15. The power supply is provided with current from the DC power supply 27 at the surface and converts the current into the appropriate DC levels for operation of equipment within the sonde 12.

As mentioned earlier, the cable 11 provides a conductive path for DC current for operation of the sonde power supply, and also two way communication is sustained over the cable 11 between the uplink and downlink transmitters and receivers. These are operated at different frequencies so that the data transmissions can be easily separated.

SURFACE EQUIPMENT

The cable 11 is connected to the uplink receiver as shown in FIG. 1. The signal transmitted from the sonde 12 and particularly the signal which is multiplexed, scrambled, encoded, modulated, and then amplified is delivered after attenuation by the cable 11. The amount and nature of the attenuation is variable, recall FIG. 7. In part, signal distortion depends on whether or not the cable is spooled or unspooled. In part, it depends on the physical dimensions of the cable and especially the length of the cable. In part, it depends on the temperature of the cable at the surface and then in the borehole, see FIG. 5 of the drawings. In part, it depends also on cable tension. In part, it depends on the distributed circuit values in the cable which functions as a long transmission line. This signal distortion can be analyzed in the laboratory, but that is not useful because the cable is dynamically used by spooling and unspooling during operation. In any event, the cable has a transfer function which is not specifically known at all times and which transfer function is interposed between the uplink transmitter ULTX and the uplink receiver ULRX at the surface. If distortion were a fixed quantity, difficulties would be avoided. It is not fixed but is variable so that the surface located equipment must be incorporated to provide a usable output from the logging tools and the sonde 12.

CABLE CONNECTIONS

The cable connected equipment in FIG. 3 also includes the uplink receiver ULRX. That has a band pass filter connected to an AGC amp. The surface equipment also includes the equalizer, detector and decoder as shown.

Summarizing the foregoing, it will be observed that the two telemetry systems, one for transmission upwardly and the other for transmission downwardly, operate at different frequencies which are isolated from one another by means of appropriate filtering circuits. Band pass and low pass filters prevent data crosstalk. In summary, the connected sets of equipment (uplink, downlink and power supply) at the surface are isolated as a result of operating at different frequencies.

In summarizing, it will be observed that the cable 11 is used for transmission of AC data at different frequencies within specified pass bands in opposite directions. In addition, the cable 11 provides a current path for power transmission so that adequate operating power can be provided.

DESCRIPTION OF THE SIGNAL WAVE FORMS

Attention is directed to FIG. 3 (incorporated by reference) of the '333 patent which view has been divided into several portions which are vertically related to one another. This will describe how data is converted, and will be related to the response of the cable 11 in discussing FIG. 4, and will also be related to the quadrature features of this system. At FIG. 3A, a clock pulse is illustrated. A data stream of zeros and ones in a random mixture is shown at FIG. 3B. This data made up of zeros and ones has the pulse wave form shown at FIG. 3C, and is typical. The data at FIG. 3B is grouped into pairs of bits, it being recognized that two bits define four separate states. A four level translation is shown for the data at FIG. 3D. In turn, that is translated into a seven level representation at FIG. 3E. Thus, there is a correspondence where the values of zero, one, two and three in FIG. 3D are converted to seven levels. Once seven levels are defined, they are shifted by subtracting three from each value. As shown in the data at FIG. 3E, all the values are positive; when three is subtracted from each entry, level shifting is accomplished to provide a data stream centered about zero; that is, the distribution of entries provides approximately half above and half below zero. It will be observed that there are three redundant levels in the seven levels; the three redundant levels are correlated with the other levels primarily to reduce the bandwidth. Also, the three redundant levels are used to detect errors in the receiver. FIG. 3F shows the shifted seven levels; FIG. 3G merely represents the same data in graphic form. This also represents the same data in graphic form. This also represents the modulating signal which is used to amplitude modulate (AM) a carrier signal which is provided at FIG. 3H. The carrier in this illustrative instance is twice the NRZ clock frequency or provides two cycles for every one cycle shown at FIG. 3A. Restated, the time period required for one cycle of the carrier or modulating signal shown in FIG. 3H is equal to the time period required for each data symbol shown in FIG. FIG. 3G. Since the modulating signal has a digital form, it has the effect of converting each cycle at FIG. 3G into equal and opposite positive and negative peaks shown in FIG. 3I.

The explanation is more valuable when considering what occurs when the wave form at FIG. 3G is periodically sampled. The numeral 60 indicates a point which is precisely half way through the cycle which is shown at FIG. 3G. If that were the sample point at which time measurements of the pulse were made, this data would be highly accurate because it would be remote from the transitions which occur at the beginning and end of each cycle time. If however the carrier signal shown at FIG. 3H has twice the frequency as the signal shown at FIG. 3G, the point 60 would be approximately at the transition instant and would therefore be highly undesirable as a point at which measurements are made. Since the frequency at FIG. 3H is precisely double, sampling at the point 60 is highly undesirable because of this lack of certainty. Rather than use the point 60, the points 61 and 62 are preferred. The points 61 and 62 occur at the 90° and 270° instants in the cycle of the modulating signal at FIG. 3H. In other words, these are the most stable times so that sampling of the signal wave form is assured of maximum signal stability. These sample times also occur when the signal to noise ratio is better. The points 61 and 62 are at the greatest extremes relative to the state change in the modulating signal at FIG. 3H. Modulating the wave form at FIG. 3H with the wave form at FIG. 3G yields the modulated peaks shown at FIG. 3I. There, the sample points 61 and 62 are now at opposite polarities. The present apparatus prefers a modulating signal in conjunction with the data to be transmitted. If samples are selected corresponding to the sample times at 61 and 62 shown in FIG. 3I, and if the samples were actually measured, the digital values for the data points at 61 and 62 should be equal, and differ only by a sign. This is true of every four level symbol shown at FIG. 3D. In summary each consecutive symbol is converted into seven levels, thereafter being shifted as shown at FIG. 3F, and after modulating by the signal at FIG. 3H, yields the modulated carrier shown at FIG. 3I. This has a valuable attribute which will be discussed below.

Assume now that the modulated wave form at FIG. 3I is transmitted on the cable 11. Assume further that the data points 61 and 62 represent 3.0 units which, on decoding, convert into the indicated four level symbol and then the NRZ symbols shown in FIG. 3. Assume on reception that the AGC amplifier outputs the distorted signals. Going now to FIG. 4 of the '333 patent, the data point 61 is assumed to be in the range of about −2.5 to about −3.5 as shown in the left hand column. The data point 62, on the other hand, might be in the range of about 2.5 to about 3.5 as described in the left hand column. The next column shows the ranges in which slicing must occur. Considering the top most entry, namely the range of 2.5 to 3.5 units, this is a range of 1.0 in which slicing must occur. Assume further that the signal level of 3.0 was transmitted, but the received signal is any value between 2.5 and 3.5. Slicing involves adjustment of the signal output to 3.00. That is shown in the third column of FIG. 4 and that data symbol is ultimately decoded to the four level output which is shown in the right hand column. For example, assume that the AGC output value is 3.18. This requires slicing or subtraction of 0.18 units to obtain the slicer output of 3.00 units. A similar slicing operation is required if the AGC output is 2.92 in which instance slicing would involve the addition of 0.08 units to obtain the output of 3.00. This operation can be repeated for all the various slicing ranges in FIG. 4. It is noted that each range is equal in width being 1.00 units in this measurement system. Thus, the seven slicer output levels are shown. One feature of the tabular entries in FIG. 4 is the redundancy found in conversion from seven levels at the slicer output to the decoded output of four levels. Interestingly, of the four levels, three of the four levels have ambiguous or two different corresponding slicer output levels. For instance in the four level system, a zero is represented by slicer output signals of +1 and −3. In summary, FIG. 4 shows how the filtering system makes the conversion, how slicing is implemented, and how reconstructed levels are obtained for the seven level encoding system which is subsequently decoded to four levels and which in turn is utilized for data conversion.

QUADRATURE ENCODING AND DECODING

Figure 8:
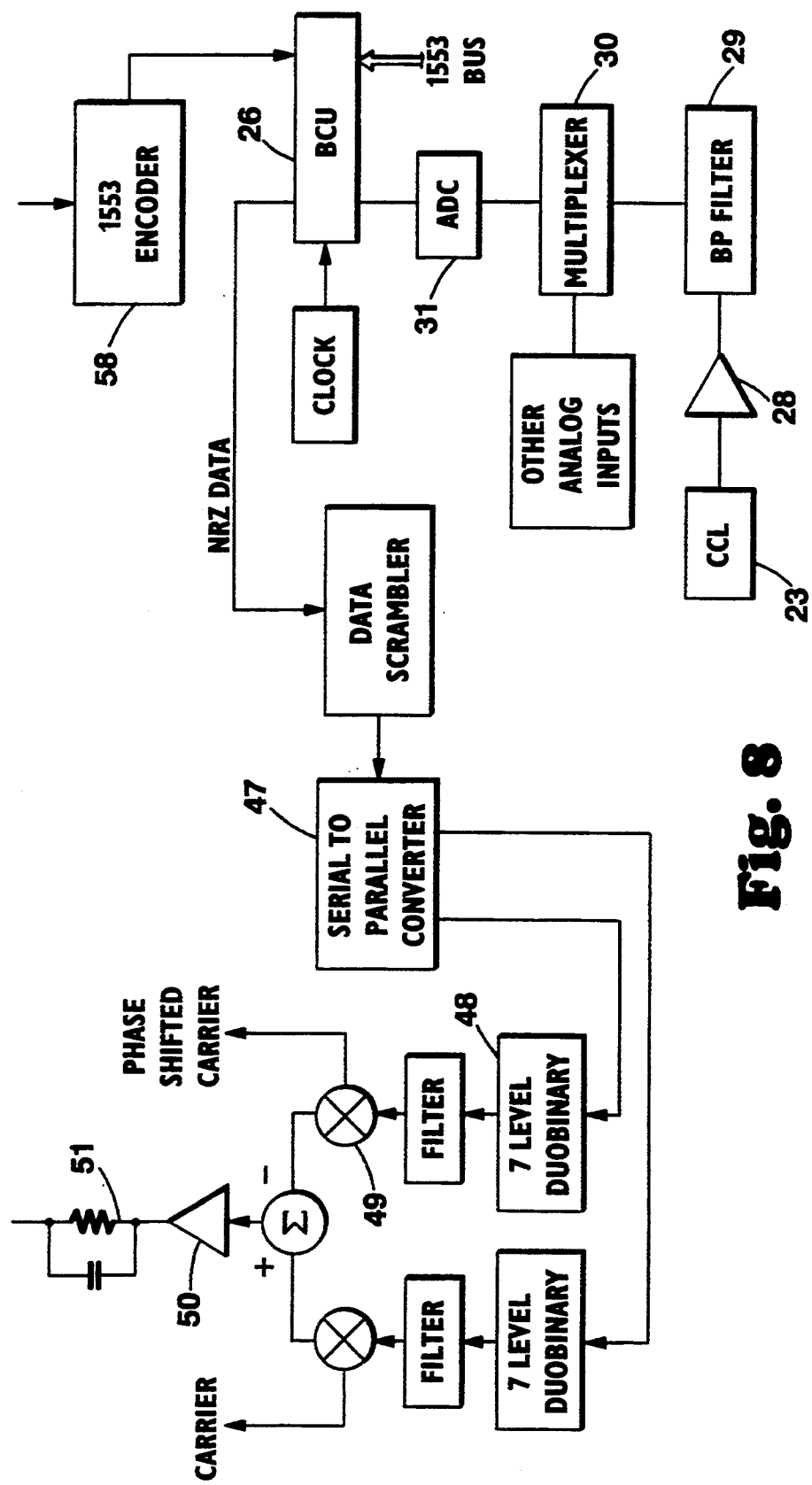
FIG. 8 is a first sonde supported quadrature encoding apparatus showing how the signal is formed for transmission on the logging cable.

FIG. 8 of the drawings shows a serial to parallel converter 47. It is provided with a data flow which is scrambled NRZ data. The data is provided to the converter so that four consecutive bits of data are input, thereby forming a parallel four bit output word. The converter then converts the four bit word into a seven level symbol which is the duobinary encoding mechanism mentioned in the '333 patent. In this particular instance, the seven level conversion is formed in a pair of duplicate seven level duobinary circuits. The alternating transmission of the four bit words from the converter 47 assigns the alternating four bit words to the two converters 48. Conversion output has the form of a seven level signal, (FIG. 3G of the '333 patent) then filtered and modulated with the modulating signal. This modulation occurs with the carrier in the modulator circuit 49. The two modulated carriers are added and input to the amplifier 50. One modulating signal or carrier is shown in FIG. 3H, and the second is the signal phase shifted by 90°. In other words, one channel is provided with the in phase carrier and the other is 90° shifted.

The two signals (differing in phase by 90°) are added for the amplifier 50. The quadrature arrangement transmits information in a complex carder signal. This has an in phase or real component and also an out of phase or imaginary component, utilizing the mathematical terms normally applied to a quadrature signal. One data stream is in the real component and the other data stream is in the imaginary component. The modulating signals are identical in format and differ by 90°. The quadrative encoding of two signals permits two channels of data to be placed on the cable. Both channels of data (each being a seven level signal exemplified at FIG. 3I) are transmitted from the sonde 12 up the logging cable 11. At the surface, the two signals are separated from one another and are then used in a fashion to be described. This quadrature signal is mathematically represented as the complex modulation of the complex carrier signal. This has a complex notation or representation with a real and an imaginary component.

QUADRATURE UPLINK RECEIVER

Figure 9:
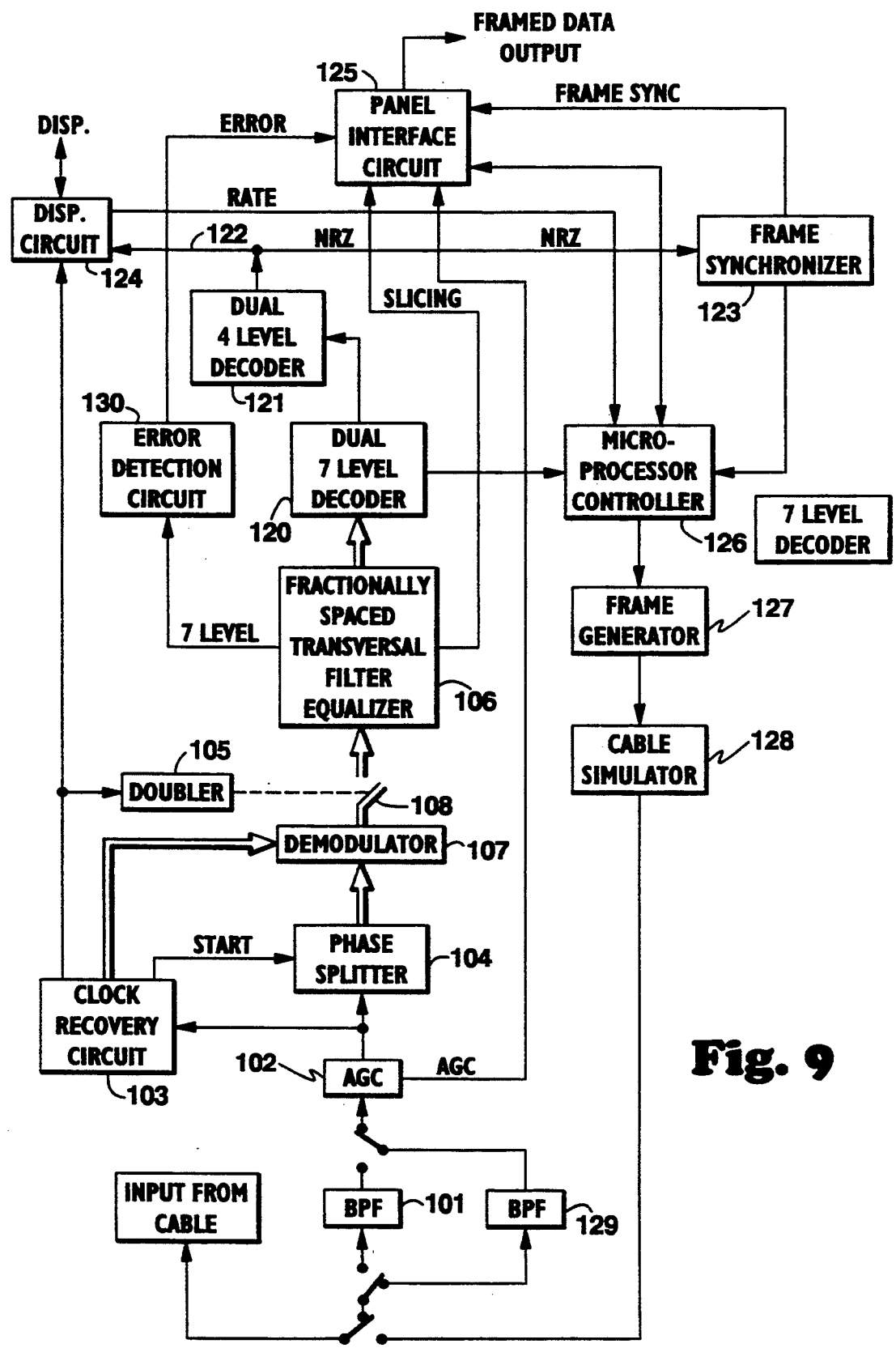
FIG. 9 depicts the clock recovery circuit which forms the clock signal at the surface.

Attention is now directed to FIG. 9 of the drawings for a detailed description of the logging system located in the surface equipment and included in the uplink receiver ULRX as illustrated in FIG. 1. FIG. 9 shows an input band pass filter connected to the cable output amplified by an acceptable amount. The amplified analog output signal is provided to a clock recovery circuit . This circuit is discussed in some detail later. Even though the signal originated as a multilevel digital signal, it is nevertheless converted into an analog signal subject to distortion on transmission along the logging cable 11 so that this distortion to analog values (see FIG. 7) and cable transmission obscures any sharp delineation which might otherwise provide easy clock synchronization. Synchronization signals are buried in the received signal and they must be extracted by the clock recovery circuit . That circuit forms a complex output clock signal which is a gated input to a phase splitter to trigger and synchronize its operation.

Assume that the duobinary, seven level signal shown at FIG. 31 is transmitted by the cable in quadrature. Assume further that the signal loses a substantial portion of its high frequency components in transmission to the surface, note the frequency loss in FIG. 6. In that event, the analog signal received at the surface still has a carrier frequency signal. The clock signal is recovered as mentioned, and phase splitting occurs to separate the two signals trains.

The complex signal having one component which is in phase with the clock (or reference) signal also encodes a quadrature signal. Both signals are incorporated in the transmitted complex carrier. Recall the following key aspects regarding creation of the signals which are actually sent up the cable. At a specific carrier frequency, the seven level wave form represented at FIG. 3I is modulated onto the carrier signal. However, it is more than simply the modulated seven level signal shown at FIG. 3 of the '333 patent.

The distortion which occurs in the cable transmission exemplified in FIG. 7 (having the form of loss of harmonics at higher frequencies, time delay and phase shift) makes recovery difficult. In a strict sense, it involves the smearing of signals so that sequentially transmitted symbols received at the surface are smeared. In other words, they are smeared over time. Therefore, the data transmitted in a single pulse is not in a single pulse recovered at the surface. Rather, a fractionally spaced transversal filter system 106 is used to sort out and recover individual data sequentially transmitted on the logging cable. The filtering process involves n consecutive pulses sequentially passed through the filter reconstruction by an adaptive process up to n consecutive output symbols summed through adaptive coefficients in the filter. Smearing inevitably involves one received data pulse with the adjacent data pulses; since the filter makes the appropriate adjustments, the received data is then be unsmeared. The complex signal involves distortion of the in phase data with the phase shifted data. The two data trains have intertrain smearing. The (both the in phase and the quadrature parts) output of the fractionally spaced equalizer must have the complex carrier first removed and is then provided to a slicer 80. The teachings of the '333 patent are incorporated to show the slicer and various slicing levels.

COMPLEX DATA TRANSMISSION AND RECOVERY

As shown in FIG. 8 of the drawings, the scrambled NRZ data is input to a serial to parallel converter 47. From that point forward it becomes two separate data streams. However, the converter 47 alternately assigns data words to the two respective data streams. The two data streams are interleaved by the complex modulation. The two data streams in FIG. 8 are derived from a single tool. They derive from a single NRZ data stream divided by alternating between the quadrature and the in phase components. The two data streams are restored as one data stream at the surface.

Figure 10:
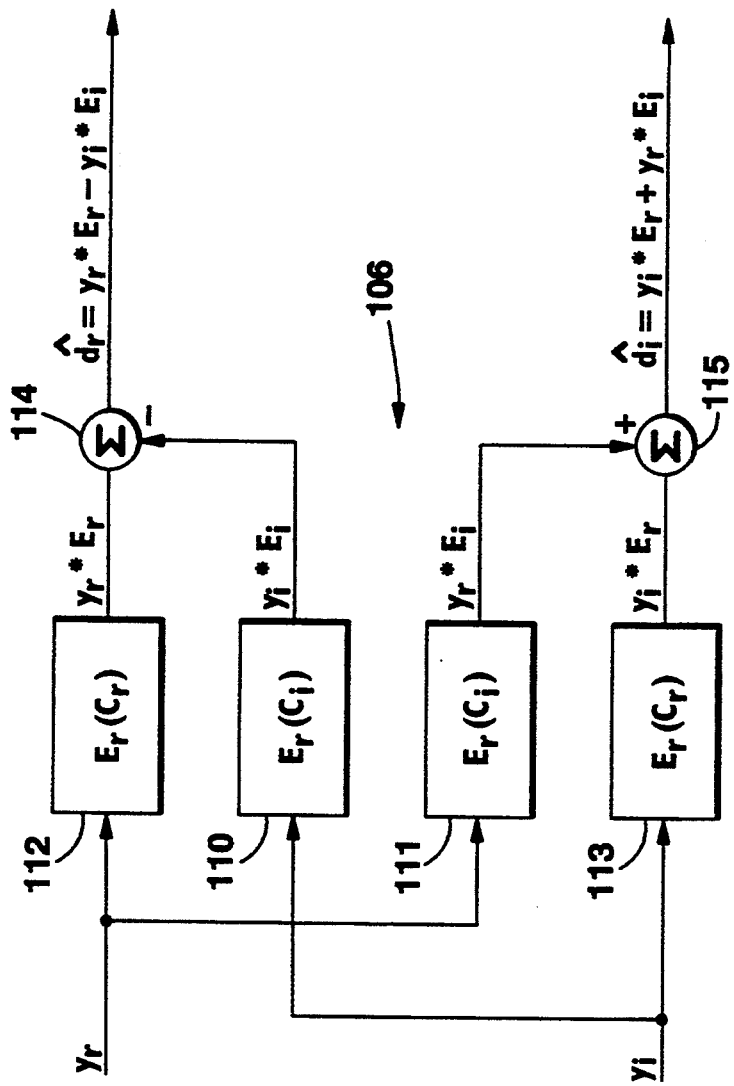
FIG. 10 depicts the transversal filter equalizer.

FIG. 9 shows the clock recovery circuit 103 which forms the clock signal at the surface. It is provided to a frequency doubler 105. In addition to that, it is converted to a complex signal by forming a time shifted duplicate carrier signal. The two signals differ by 90°, meaning they have a quadrature angle between the two signals. Moreover, the complex are carriers provided to a demodulator 107 and the carrier is removed from the signal. At the time the instance is controlled at a switch 108 connected with the doubler 105, the signals are input to the fractionally spaced transversal filter equalizer 106. The equalizer 106 converts the input signal into a pair of interleaved seven level signals for a seven level decoder. More specifically, the fractionally spaced transversal filter equalizer 106 is shown in FIG. 10 of the drawings. There, it has the form of four similar fractionally spaced transversal filters. There is intertrain smearing which is dealt with by the equalizers 110 and 111. In conjunction with the equalizers 112 and 113, the in phase and out of phase or quadrature components are recovered with a reduction in intertrained smearing. As shown in FIG. 10, the inputs are $Y_i$ and also $Y_r$ which are processed by the four equalizers and summed by the summing circuits 114 and 115. The outputs are then formed with a substantial reduction in smearing between the two data trains. In an illustrative embodiment, each of the equalizers 110–113 may comprise a complex equalizer such as an adaptive transversal filter equalizer. As is well known in the relevant art, such equalizers may be operated to provide an output signal based upon an input signal and a series of adjustable complex coefficients. The input signals may comprise multi-level signals, such as 7-level signals.

Typically, input signals are received and sequentially advanced into different stages of a delay buffer. Input signals in different stages are then multiplied by coefficient signals corresponding to those respective stages. The products of this multiplication are summed to provide the output signal.

In accordance with the invention, as shown in FIG. 10, a set of "real" coefficients ($C_{jr}$) and a set of imaginary coefficients ($C_{ji}$) are provided. The coefficient signals are modified between each sequential advancement according to a routine. The real coefficients, for example, may be modified as shown in Equation 1 (below):

$$C_{jr}(n+1) = C_{jr}(n) + \beta(e_r y_{jr} - e_i y_{ji}) \quad (1)$$

where:
- $C_{jr}(n+1)$ = the "new" real coefficient corresponding to the jth delay stage;
- $C_{jr}(n)$ = the "old" real coefficient for the jth delay stage;
- $\beta$ = a sensitivity constant to adjust the rate at which the coefficients are changed;
- $e_r$ = the real component of an error signal provided by the error detection circuit 130;
- $e_i$ = the imaginary component of the error signal provided by the error detection circuit 130;
- $y_{jr}$ = the real component of the input signal present at the jth delay stage; and
- $y_{ji}$ = the imaginary component of the input signal present at the jth delay stage.

In accordance with the invention, the equalizer 112 receives the real input signal $y_r$ and provides an output based upon $y_r$ and the coefficients $C_r$ of the equalizer 112. Likewise, the equalizer 111 receives the real input signal $y_r$ and provides an output based upon $y_r$ and the coefficients $C_i$ of the equalizer 111. Moreover, the equalizer 110 receives the imaginary input signal $y_i$ and provides an output based upon $y_i$ and its coefficients $C_i$. Likewise, the equalizer 113 receives the imaginary input signal $y_i$ and provides an output based upon $y_i$ and its coefficients $C_r$.

The outputs of the equalizers 110, 112 are summed by a summing circuit 114. Similarly, the outputs of the equalizers 111, 113 are summed by a summing circuit 115. Hence, in accordance with the invention, the equalizers 110-113 receive real ("in-phase") and imaginary ("out-of-phase") components from a demodulator 107, and provide output signals to be processed by the decoders 120 and 121. The two data trains output by the equalizer 106 thus have the form of separate seven level Signals input to the decoder 120 then input into the four level decoder 121. That forms an output data stream which is strictly binary in form, that being an NRZ data stream. That data stream is provided to a conductor 122 and is then furnished to a frame synchronizer 123. That defines the frames of data so that data storage and subsequent processing can be carried out. Obviously, if only a single signal source is used, then there is not need to recognize specific frames of data.

Another aspect of the NRZ output signal 122 is provision of the signal to a display circuit 124. In addition to that, the framed data from the synchronizer 123 is provided to a panel interface circuit 125 for output. The framed data is likewise provided to a microprocessor 126. Optionally, the microprocessor 126 can be used to provide test routines which are delivered to a frame generator 127 and a cable simulator 128 which is input to the band pass filter 101 previously mentioned. In addition to that test routine, there is an additional input filter 129 which enables testing with a different pass band.

The system likewise includes an error detector circuit 130 which forms and error signal when that occurs, and the error signal is then provided to the panel interface circuit 125 as needed.

DUAL DATA STREAM MERGER

As noted with regard to FIG. 8 of the drawings, the data stream is converted to so that alternate data words are encoded in phase and the remaining data words are encoded in quadrature. This is accomplished in the sonde and is transmitted along the cable. At the surface, the two data streams are separated. They are output by the complex equalizer circuit shown in FIG. 10 of the drawings which forms two output data streams to the seven level decoder. This requires duplicate decoders which form two output data streams which are then provided to the four level decoder 121. The two data streams are merged, and thereby form the reconstructed data transmitted from the sonde.

While the foregoing is directed to the preferred embodiment, the scope thereof is determined by the claims which follow:

We claim:

1. An uplink receiver for a wireline logging telemetry system, comprising:
    a) a phase splitter to receive an analog signal corresponding to an uplink quadrature signal transmitted by a downhole sonde and to separate the received analog signal into first and second components, said first and second components being modulated with a carrier signal;
    b) a demodulator to provide in-phase and out-of-phase components by removing the carrier signal from the first and second components; and
    c) a transversal filter equalizer to provide a pair of interleaved multi-level signals corresponding to the in-phase and out-of-phase components.

2. The uplink receiver of claim 1, wherein the transversal filter equalizer comprises:
    1) a first transversal filter equalizer, to provide a first output signal by processing the in-phase component according to a first equalization routine;
    2) a second transversal filter equalizer, to provide a second output signal by processing the out-of-phase component according to a second equalization routine;
    3) a third transversal filter equalizer, to provide a third output signal by processing the in-phase component according to the second equalization routine;
    4) a fourth transversal filter equalizer, to provide a fourth output signal by processing the out-of-phase component according to the first equalization routine;

5) a first summing circuit to provide a first multi-level signal by summing the first and second output signals; and 6) a second summing circuit to provide a second multi-level signal by summing the third and fourth output signals.

3. The receiver of claim 2, wherein the first, second, third, and fourth transversal filter equalizers are fractionally spaced.

4. The receiver of claim 1, further including at least one decoder to convert the pair of multi-level signals into a binary signal.

5. The receiver of claim 4, further including a display circuit to visually display signals representative of the binary signal.

6. A method of processing uplink signals in a wireline logging telemetry system, comprising steps of:

a) receiving an analog signal corresponding to an uplink quadrature signal transmitted by a downhole sonde and separating the received analog signal into first and second components, wherein said first and second components are modulated with a carrier signal;

b) providing in-phase and out-of-phase components by removing the carrier signal from the first and second components with a demodulator; and c) applying a transversal filter equalizer to the in-phase and out-of-phase components to provide a pair of interleaved multi-level signals.

7. The method of 6, wherein step (c) comprises steps of:

1) providing a first output signal by processing the in-phase component according to a first equalization routine;

2) providing a second output signal by processing the out-of-phase component according to a second equalization routine;

3) providing a third output signal by processing the in-phase component according to the second equalization routine;

4) providing a fourth output signal by processing the out-of-phase component according to the first equalization routine;

5) summing the first and second output signals to create a first multi-level signal; and 6) summing the third and fourth output signals to provide a second multi-level signal.

8. The method of claim 6, further including a step of decoding the pair of multi-level signals to provide a binary signal.

9. The method of claim 6, further including a step of visually displaying signals representative of the binary signal.

* * * * *

UNITED STATES PATENT AND TRADEMARK OFFICE
CERTIFICATE OF CORRECTION

PATENT NO.: 5,387,907

DATED: February 7, 1995

INVENTORS: Gardner et al.

It is certified that errors appears in the above-identified patent and that said Letters Patent is hereby corrected as shown below:

Column 1, line 17, delete "toonotable" and insert therefore --monocable--.

Column 1, line 33, delete "devil" and insert therefore --detail--; delete "sisals" and insert therefore --signals--.

Column 1, line 38, delete "devil" and insert therefore --detail--.

Column 2, line 8, delete "feed" and insert therefore --fed--.

Column 2, line 57, after "also" insert --be--.

Column 3, line 12, delete "looses" and insert therefore --loses--.

Column 3, line 36, delete "provides" and insert therefore --provide--.

Column 5, line 59, delete "inphase" and insert therefore --in-phase--.

Column 6, line 7, after "detail," insert --a--.

Column 6, line 25, after "FIG. 1" insert --;--.

Column 6, line 38, after ";" delete "and".

Column 6, line 41, delete "." and insert therefore --;--.

Column 6, line 43, delete "." and insert therefore --; and--.

Column 11, line 41, delete "a".

Column 13, line 35, delete "FIG.", first occurrence.

UNITED STATES PATENT AND TRADEMARK OFFICE
CERTIFICATE OF CORRECTION

PATENT NO.: 5,387,907

DATED: February 7, 1995

INVENTORS: Gardner et al.

It is certified that errors appears in the above-identified patent and that said Letters Patent is hereby corrected as shown below:

Column 15, line 37, after "recovery circuit" insert --103.--.

Column 15, line 47, after "recovery circuit" insert --103--.

Column 15, line 51, delete "31" and insert therefore --3l of the '333 patent--.

Column 16, line 19, delete "be".

Column 16, line 47, delete "are carriers" and insert therefore --carriers are--.

Column 17, line 58, delete "Signals" and insert therefore --signals--.

Column 18, line 14, delete "and" and insert therefore --an--.

Column 18, line 21, delete "to".

Signed and Sealed this

Thirtieth Day of May, 1995

Attest:

BRUCE LEHMAN

*Attesting Officer*    *Commissioner of Patents and Trademarks*